United States Patent [19]
Braginsky

[11] Patent Number: 5,869,828
[45] Date of Patent: Feb. 9, 1999

[54] COLOR AND SHAPE SYSTEM FOR ENCODING AND DECODING DATA

[76] Inventor: Philip Yale Braginsky, 68-09 Booth St., Apartment 1V, Forest Hills, N.Y. 11375

[21] Appl. No.: 631,660

[22] Filed: Apr. 2, 1996

[51] Int. Cl.⁶ ...................................................... G06F 7/12
[52] U.S. Cl. ........................................... 235/467; 236/465
[58] Field of Search ..................................... 235/465, 469

[56] References Cited

U.S. PATENT DOCUMENTS

| | | | |
|---|---|---|---|
| 2,612,994 | 10/1952 | Woodland et al. | 235/494 |
| 3,663,801 | 5/1972 | Wahii et al. | 235/465 |
| 3,684,868 | 8/1972 | Christie et al. | 235/465 |
| 3,798,421 | 3/1974 | Gilberg et al. | 235/465 |
| 3,818,191 | 6/1974 | Fennema et al. | 235/465 |
| 4,009,466 | 2/1977 | Clark | 235/469 |
| 4,044,227 | 8/1977 | Holm et al. | 235/465 |
| 4,488,679 | 12/1984 | Bockholt et al. | 235/469 |
| 4,939,674 | 7/1990 | Price et al. | 364/523 |
| 5,369,261 | 11/1994 | Shamir | 235/469 |
| 5,406,640 | 4/1995 | Fitzpatrick et al. | 382/11 |
| 5,426,289 | 6/1995 | Kinoshita et al. | 235/469 |
| 5,576,528 | 11/1996 | Chew et al. | 235/469 |

FOREIGN PATENT DOCUMENTS

| | | | |
|---|---|---|---|
| 405081462 | 4/1993 | Japan | 235/465 |

*Primary Examiner*—Anita Pellman Gross
*Assistant Examiner*—Douglas X. Rodriguez
*Attorney, Agent, or Firm*—Philip Braginsky

[57] ABSTRACT

A color code system for encoding information on products and other substrates. The color code is printed by a color printer using single intensity colors in specific shapes aligned side by side successively. The code is predetermined. The code can be read by a video device and decode by a computer. The present invention allows for densely packed encoded information in a small space that can be cheaply and easily read and decoded.

12 Claims, 2 Drawing Sheets

COLOR AND SHAPE SYSTEM FOR ENCODING AND DECODING DATA

FIELD OF THE INVENTION

This invention generally relates to the representation of data using color combinations, and specifically to the use of one or more single-intensity colored shapes for encryption of data in a code that can be machine read.

BACKGROUND OF THE INVENTION

The use of machine read encoded information systems is prevalent in all aspects of our market dominated society. We find encoded data on products of industry, documents and living beings. The information encoded can be identification, demographics or machine functions and is carried by magnetic tapes or stripes, optical disks or cards, or printed labels. There is a demand to store greater amounts of information using a machine read encoded information system.

One common form of encoding information is by bar code. The bar code is a pattern of bars of various widths distanced apart from each other by varying widths of spaces. The bar and space have different light reflective properties thereby allowing a binary code to be digitally encoded. A typical binary bar code is eight spaces in size which allows encoding two choices (bar or no bar) in eight spaces arranged successively. This yields an 8 bit number or 256 choices to encode information in 1 byte. Bar codes have been modified and improved on in many ways but still lack an adequate data packing density to meet industry needs.

A one-dimensional code is read only linearly. The one-dimensional bar code format allows a machine read encoded information system to access a database using the code it has read. The database holds the information that is sought. Reading a one-dimensional bar code only allows for further processing in some database. A two-dimensional code is read vertically and horizontally. This allows for greater packing density within a bar code sequence and therefore can contain the information that is to be accessed without further processing.

A common method for achieving a two-dimensional code is by stacking a bar code in rows and columns. This however can lead to the loss of vertical synchronization. The loss of vertical synchronization is overcome by using row and column identifiers but at an obvious reduction in information density.

One approach for achieving great packing density while maintaining a simple syntax and overcoming any loss in vertical synchronization would be the use of colors for encoding.

SUMMARY OF THE INVENTION

The present invention is directed to a simple encoding method that utilizes simple printing means, simple reading means and simple decoding means. A combination of color is used in specific shapes arranged successively. One specific shape and color are used as a background while another specific shape and color are used to mark this background. These shapes are first printed, successively in a line or in some other pattern, on a label or packaging or any other surface substrate. They are printed in a predetermined code to represent information. They are then read by the reader. The pattern which is the encoded message is then transmitted to the decoder for decoding the information.

Accordingly, it is an object of this invention to provide an improved optically readable code means.

It is another object of this invention is to provide an optically readable code which can be read by ordinary video means.

Another object of this invention is to provide an optically readable code which can be easily decoded by a computer.

It is a further object of this invention to provide an optically readable code which can be printed by ordinary color printers.

It is an advantage of the present invention that it dynamically encodes information in a dense format.

It is another advantage of the present invention that it is reliable and easily manufactured.

It is a further advantage of the present invention that it has an inherent parity check.

It is a feature of the present invention that it uses color to encode information.

DETAILED DESCRIPTION OF THE PREFERRED EMBODIMENT

Figure 1:
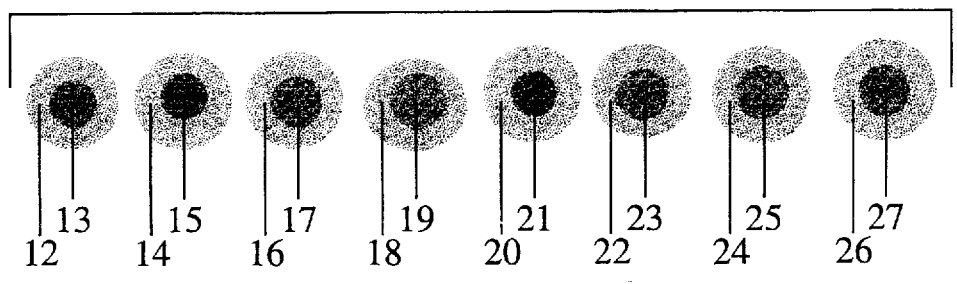
FIG. 1 is a representation of the present invention illustrating the use of different colors in specific shapes in succession to represent information.

FIG. 1 illustrates a color code 10 comprising circular shapes aligned successively. The surface substrate 11 is the page which is printed on. The background circle 12 is a single intensity colors. The marking circle 13 is a single intensity color. This continues for 14 and 15, 16 and 17, 18 and 19, through 27. The color code 10 is composed of eight successive background circles of single intensity colors marked by marking circles of single intensity colors. These circles can be dynamically changed to larger or smaller areas. The circles can be reduced to a size that the printing means imposes on it and until it reaches the resolution limit of the video device used to read the code.

The encryption code is predetermined by selecting each color and color combination to represent a binary sequence.

Figure 2:
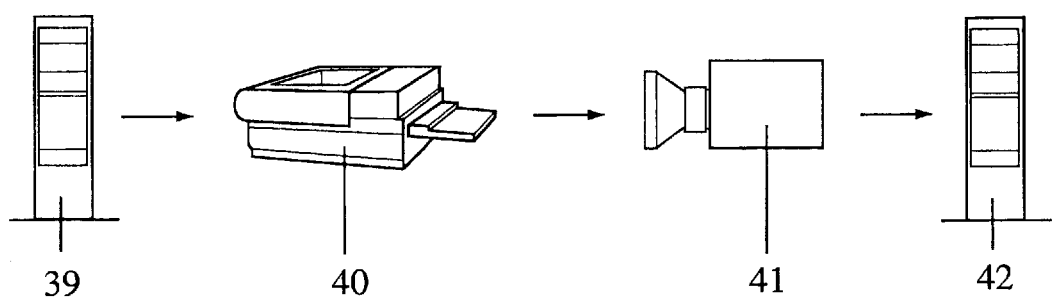
FIG. 2 is a flow chart of the method for encoding, printing, reading and decoding the information.

The function of the CPU 39 in FIG. 2 is to encode information into a color symbology. The function of the printer 40 in FIG. 2 is to print a label to affix on a product or to print directly on the product the symbol sequence determined by the CPU 39 to represent the information desired. The label is affixed to the product. The symbol sequence can then be read by a video device 41. The video device transmits its image to the CPU 42 which decodes the color code.

The present invention has many advantages over the prior art coding formats for encoding information on products. The present invention has exponentially more packing density capability than bar codes. If one were to use circles as the specific shape for the background and a significantly smaller circle as the shape of the marker and 11 different single intensity colors, one can generate $4.59 \times 10^{16}$ choices. The color code format is information dense enough to continue using one-dimensional sequences read linearly. A two-dimensional color code format is easily accomplished for more information.

The information packing density allows information to be encoded many times within the same code sequence to help reduce any error in reading that might occur. By using single intensity colors the present invention can be read by an ordinary video device and can be printed by an ordinary color printer. Single intensity colors will also reduce the error rates from faded or unclean printing.

By using specific shapes and colors as backgrounds and marking elements, a parity check is inherently contained within the code. As the reading means scans the first symbol of a symbol sequence it must pass through the color of the background into the color of the marking element and then through the color of the background again. This redundancy is an inherent check of whether the reading means has properly scanned the entire symbol and that the colors and shapes have been properly read.

Accordingly, it should be readily appreciated that the color code of the present invention has many practical applications. Additionally, although the preferred embodiment has been illustrated and described, it will be obvious to those skilled in the art that various modifications can be made without departing from the spirit and scope of this invention.

Figure 3:
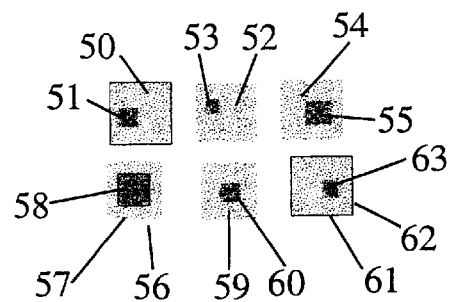
FIG. 3 is a second embodiment of the representation of the present invention.

FIG. 3 illustrates a second embodiment of the code semantics. Here, the format is smaller. The square 50 signifies some information, the color of square 50 signifies some different information. The outline of square 50 is the same color as the fill color which may signify some further information. Square 51 lies on top of square 50 marking it. Squares 52 through 55 continue this same configuration. Square 58 has an outline, 57, of a different color. This is also shown on square 62 which has outline 61. The color of these outlines signify information and the fact that they are a different color than he fill color of the square they surround (or that the outline is present) also has significance in the code.

Figure 4:
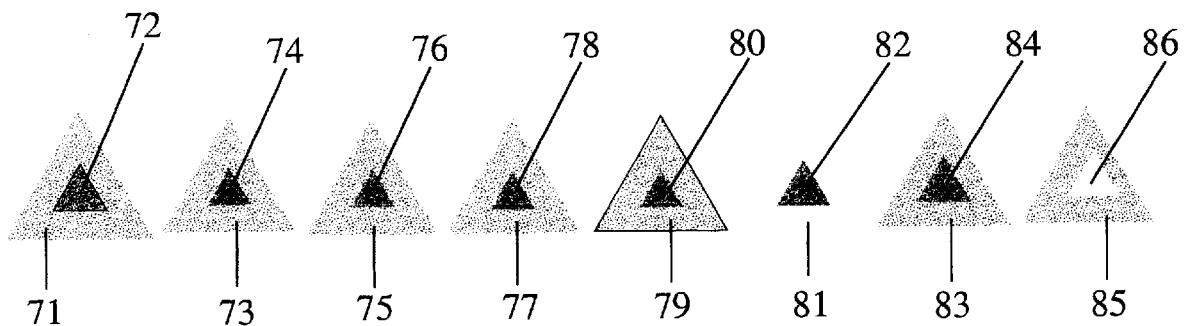
FIG. 4 is a third embodiment of the representation of the present invention.

FIG. 4 illustrates a third embodiment of the code semantics. Here, the large triangular shape 71 signifies information. The color of triangle 71 signifies information. The outline of triangle 71 is the same color as the fill which also signifies information. The triangular shape of 72 signifies information. Its position as a marking element on triangle 71, its color, and its outline, 71, all signify information. This continues for triangles 73 through 86. "Triangle" 81 has the same fill color as the substrate on which it is printed.

Figure 5:
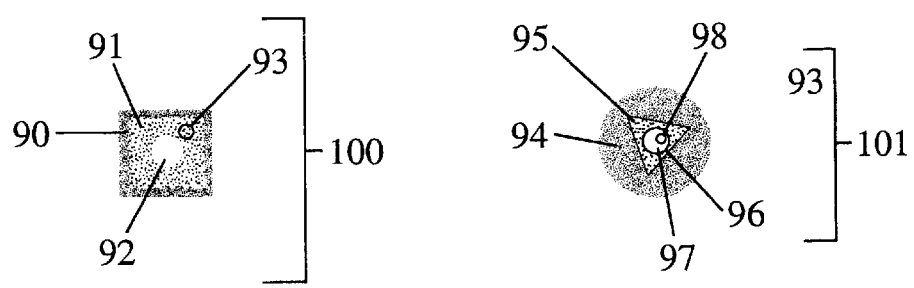
FIG. 5 is a fourth embodiment of the representation of the present invention.

FIG. 5 illustrates a fourth embodiment of the code semantics. Here the square shape of 90, signifies information. The same for the square shape of 91 plus its position on square 90. The fact that their outlines do not appear or are the same color as the fill color of the squares signifies information. The same also for the circular shapes 92 and 93 which also signify information in their positions on squares 90 and 91. This calculus continues for 94 through 98. The position of each group of shapes 100 and 101 in relation to the other also contains some significance.

What is claimed:

1. A machine readable code for representing data comprising:

at least one background frame region each of a specific shape and each of a single intensity color;

at least one marking window element each of a specific shape and each of a single intensity color other than the background frame region and placed on the background frame region;

wherein the position, shape, and color of the marking window elements with respect to the background frame region, defines information to be encoded.

2. A machine readable code for representing data as in claim 1 wherein:

the background frame region and the marking window element are separated by an outline around the marking window element.

3. A machine readable code for representing data as in claim 1 wherein:

at least one background frame region is separated from the other background frame regions by an outline.

4. A machine readable code for representing data as in claim 1 wherein:

the code is one-dimensional.

5. A machine readable code for representing data as in claim 1 wherein:

the code is two-dimensional.

6. An encoding and decoding system comprising:

a printing means for printing one or more color code patterns, each of a specific shaped background frame of a single intensity color marked by one or more marking window elements, each of a specific shape and single intensity color other than the background frame, and arranged in successive spaces which are disposed side by side, wherein the position, shape, and color of one or more of the marking window elements with respect to the background frame region defines information to be encoded;

a reader for reading matter printed by said printing means; and decision means for deciding content of the code pattern read by the reader.

7. The printing means as in claim 6 wherein:

said printing means is an ink jet printer.

8. The printing means as in claim 6 wherein:

said printing means is a laser printer.

9. The printing means as in claim 6 wherein:

said printing means is a paint gun.

10. The reader as in claim 6 wherein:

the reader is a video camera.

11. The decision means as in claim 6 wherein:

the decision means is a computer.

12. A method of encoding and decoding data comprising:

marking on a substrate at least one specifically shaped background frame region, each of a single intensity color;

marking a background frame region with at least one marking window element, each of a specific shape and each of a single intensity color, other than the background frame region, wherein the position, shape, and color of the background frame regions and marking window elements with respect to each other defines the information that is encoded;

reading the markings on the substrate by a reading means; and deciding content of the markings by a deciding means.

* * * * *